Figure 1:
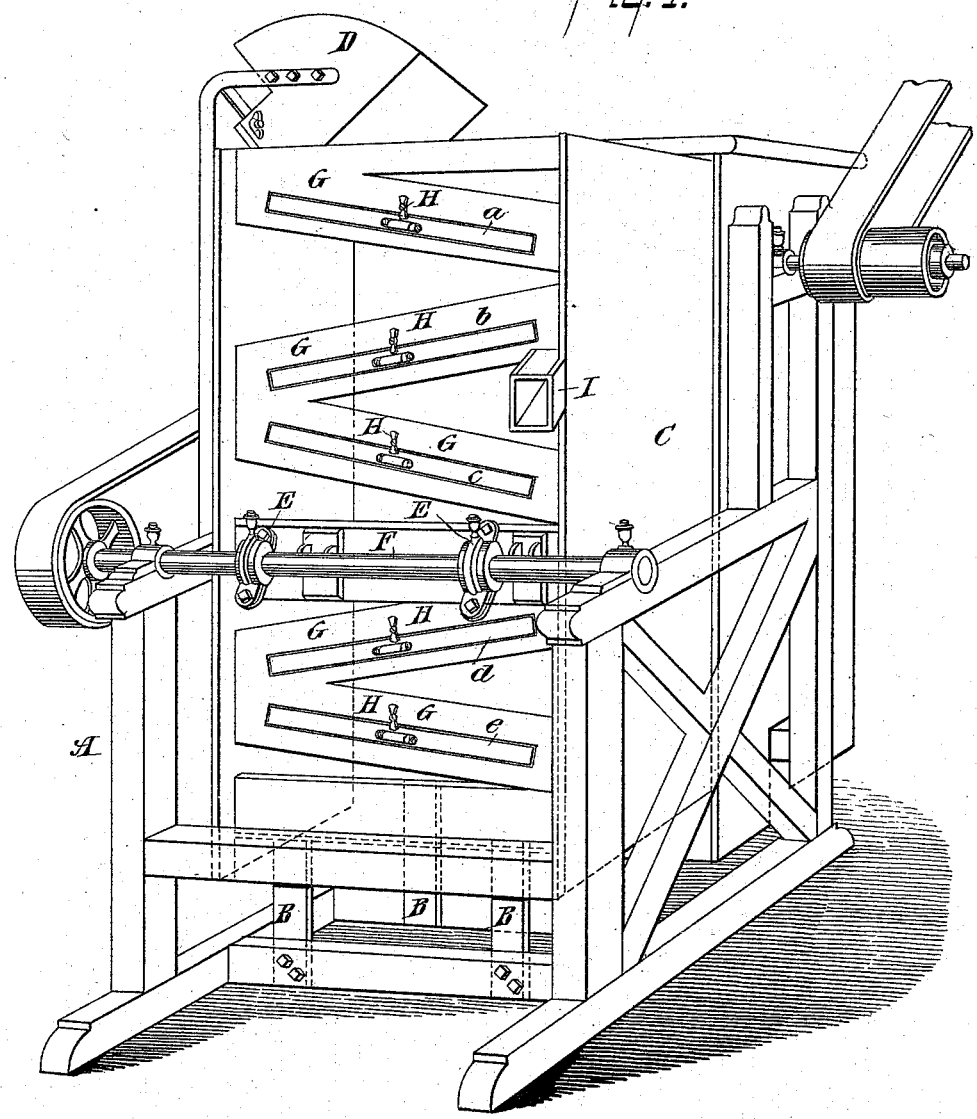

(No Model.) 5 Sheets—Sheet 1.
J. S. MILLER.
MACHINE FOR CLEANING AND SEPARATING COFFEE.
No. 530,546. Patented Dec. 11, 1894.

WITNESSES:
William Goebel.
Ed. D. Miller.

INVENTOR
John S. Miller,
BY
Chas. C. Gill
ATTORNEY.

(No Model.) 5 Sheets—Sheet 2.
J. S. MILLER.
MACHINE FOR CLEANING AND SEPARATING COFFEE.
No. 530,546. Patented Dec. 11, 1894.
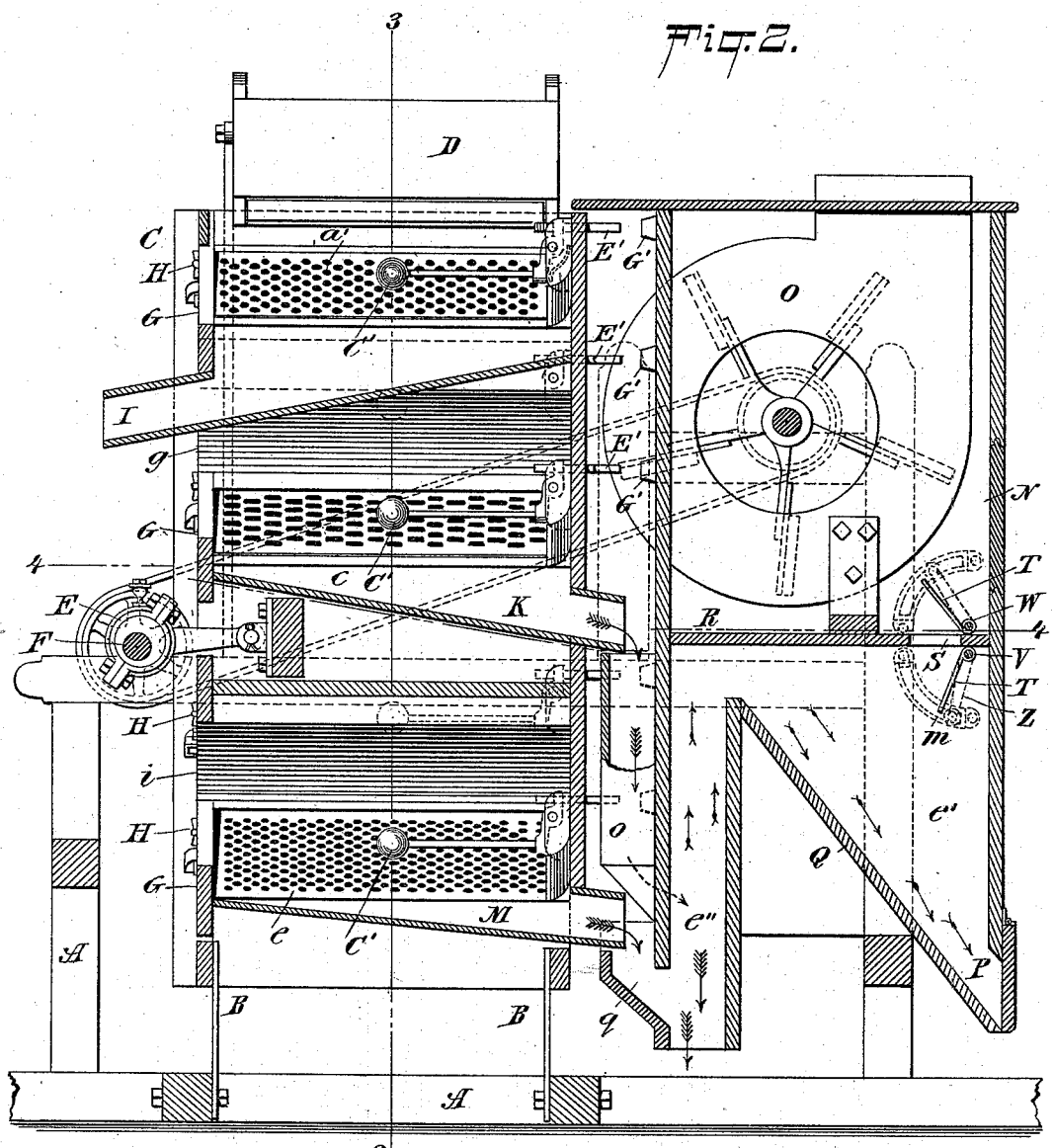
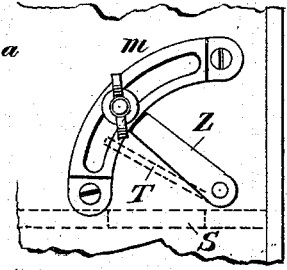
WITNESSES:
William Goebel.
Ed. D. Miller.
INVENTOR
John S. Miller,
BY Chas. C. Gill
ATTORNEY.

(No Model.) 5 Sheets—Sheet 3.

J. S. MILLER.
MACHINE FOR CLEANING AND SEPARATING COFFEE.

No. 530,546. Patented Dec. 11, 1894.

WITNESSES:
William Goebel.
Ed. D. Miller.

INVENTOR
John S. Miller.
BY
Chas. C. Gill
ATTORNEY.

THE NORRIS PETERS CO., PHOTO-LITHO., WASHINGTON, D. C.

(No Model.) 5 Sheets—Sheet 4.
J. S. MILLER.
MACHINE FOR CLEANING AND SEPARATING COFFEE.
No. 530,546. Patented Dec. 11, 1894.
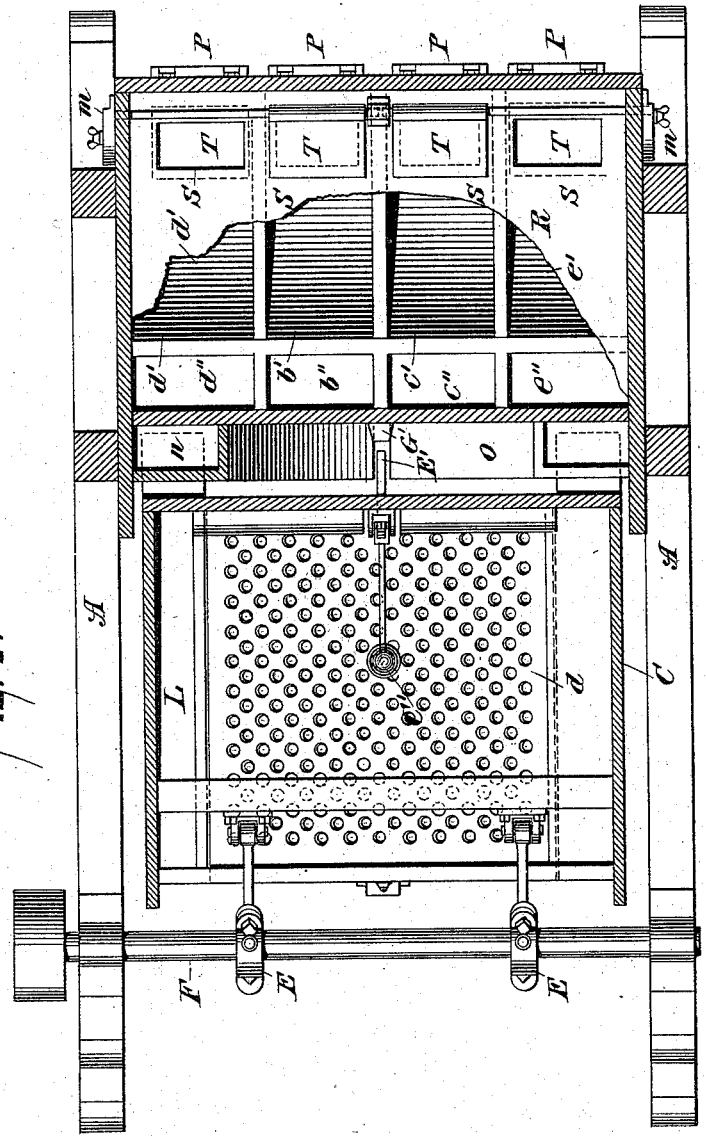
WITNESSES:
William Goebel.
Ed. D. Miller.
INVENTOR
John S. Miller,
BY
Chas. C. Gill
ATTORNEY.

(No Model.) 5 Sheets—Sheet 5.
J. S. MILLER.
MACHINE FOR CLEANING AND SEPARATING COFFEE.
No. 530,546. Patented Dec. 11, 1894.
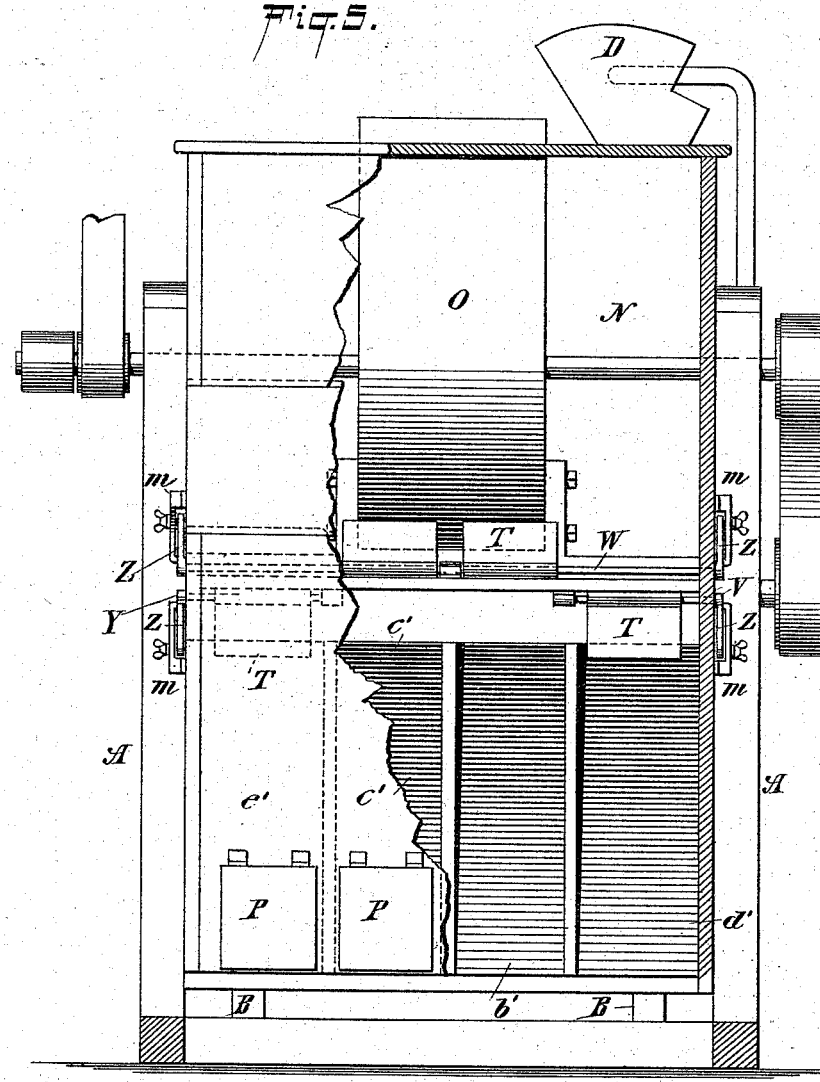
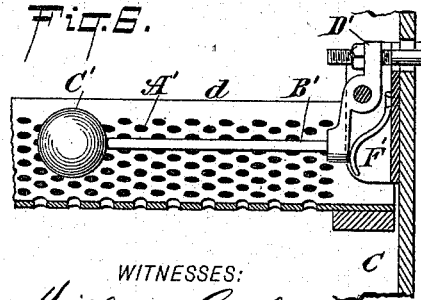
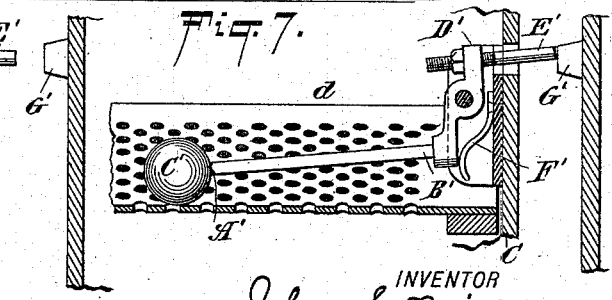
WITNESSES:
William Goebel.
Ed. D. Miller.
INVENTOR
John S. Miller,
BY
Chas. C. Gill
ATTORNEY.

UNITED STATES PATENT OFFICE.

JOHN S. MILLER, OF BROOKLYN, ASSIGNOR TO DAVID B. FRASER, OF NEW YORK, N. Y.

MACHINE FOR CLEANING AND SEPARATING COFFEE.

SPECIFICATION forming part of Letters Patent No. 530,546, dated December 11, 1894.

Application filed March 25, 1893. Serial No. 467,543. (No model.)

*To all whom it may concern:*

Be it known that I, JOHN S. MILLER, a citizen of the United States, and a resident of Brooklyn, in the county of Kings and State of New York, have invented certain new and useful Improvements in Machines for Cleaning and Separating Coffee, of which the following is a specification.

The invention relates to improvements in machines for cleaning and separating coffee, and said machine comprises a reciprocating frame carrying a series of screens and troughs, and a stationary frame containing a suction fan and a series of independent trunks and bins corresponding with the said screens. The screens are inclined toward each other at opposite sides of the reciprocating frame so that the coffee passing through one screen may reach the next following screen and so on through the series. The upper screen permits all of the coffee to pass through it and directs the sticks, strings and larger foreign matter into a discharge trough, but the remaining screens retain one grade of coffee each and permit all of the remaining coffee to pass through to the next lower screen for further separation. The coffee retained by and passing over the screens constitute the different grades, and each grade is delivered to its own independent trunk where it is subjected to air suction which elevates into a bin all the hulls, sticks, strings, light black beans and quaker beans or other foreign matter, leaving the coffee to descend to the point of delivery in good condition. Each grade of coffee passes to an independent suction trunk and each trunk connects with an independent bin, and hence each grade is kept independent and its screenings independently collected. The suction through the trunks is regulated for each trunk independently, by means of dampers.

Figure 3:
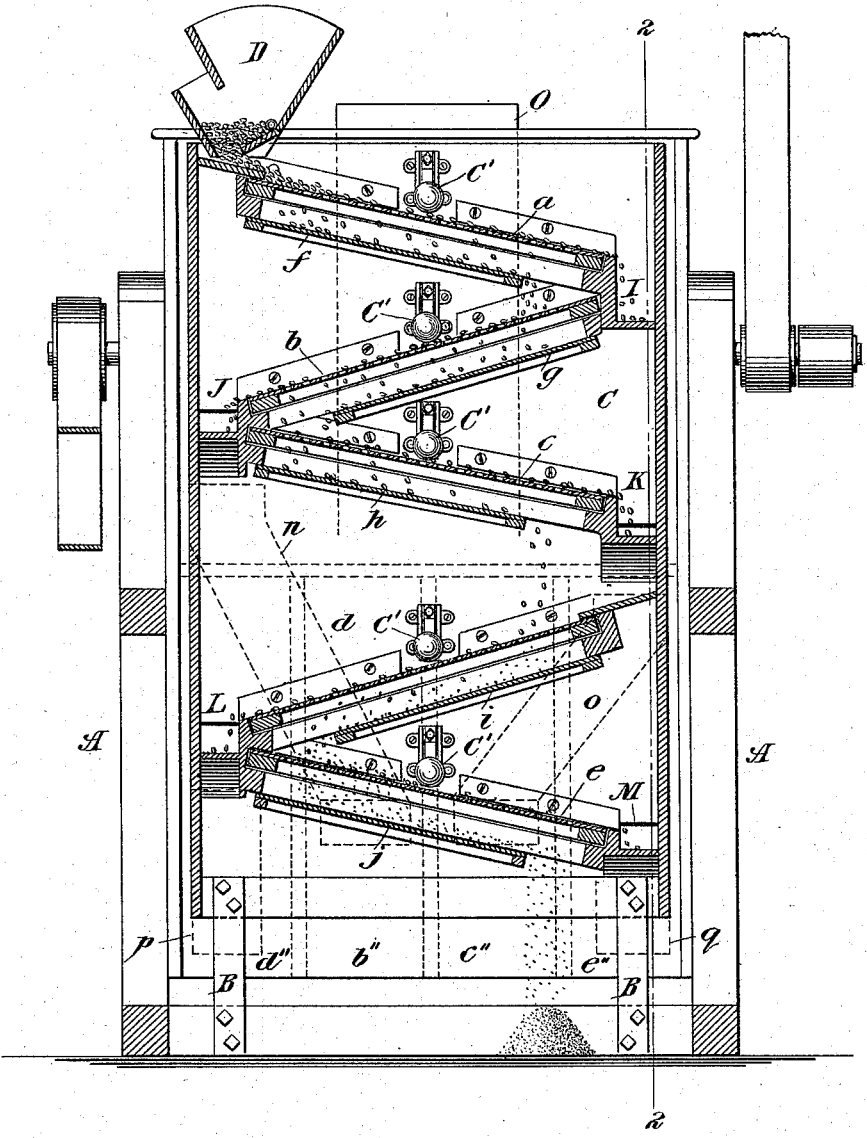

Referring to the accompanying drawings, Figure 1 is a perspective view of a machine constructed in accordance with and embodying the invention. Fig. 2 is a central vertical longitudinal section of same. Fig. 2$^a$ is a detached side view on an enlarged scale of the means for locking the dampers in any desired position. Fig. 3 is a vertical transverse section of same on the dotted line 3—3 of Fig. 2. Fig. 4 is a horizontal section of said machine on the dotted line 4—4 of Fig. 2 and partly broken away. Fig. 5 is a rear end view partly broken away and in section of same. Fig. 6 is a detached sectional view through a part of one of the screens of the machine and showing the knocker therefor in its elevated position, and Fig. 7 is a like view of same showing the knocker in its depressed position against the screen.

In the drawings A designates the main frame of the machine, between the front portion of the sides of which is supported upon flexible spring legs B the rectangular screen frame C containing the interchangeable screens $a$ $b$, $c$, $d$, $e$ and adapted to have a reciprocating or shaking motion under the action of the eccentrics E secured upon the driving shaft F.

The screens $a, b, c, d, e$ are of different mesh and incline toward the opposite sides of the frame C, as shown in Figs. 1 and 3; and said frame is provided with the series of guide frames G to receive the screens and permit their being locked in position by means of the buttons H. The receiving portions of the guide frames G correspond in dimensions with each other and with the screens, and hence the screens are rendered interchangeable and will be arranged in series in accordance with the particular coffee separation desired. The upper screen $a$ is intended to permit the coffee to pass through it, while the sticks, strings and like foreign matter ride over it to the discharge trough I, thus cleaning the coffee; but the remaining screens $b$, $c$, $d$, $e$, effect the separation of the coffee by being of a mesh to permit one grade of coffee to pass through them while the more perfect beans pass over them into troughs specially provided for the purpose, as hereinafter explained.

Below the screens $a$, $b$, $c$, $d$, $e$, are secured to the frames G the inclines $f$, $g$, $h$, $i$, $j$, shown more clearly in Fig. 3, which receive the coffee passing through each screen and direct it to the upper end of the next lower screen, by which it is further separated, one grade passing over and the other through the same.

Within the frame C and at opposite sides thereof are provided the series of inclined troughs I, J, K, L, M, the trough I being to receive the refuse escaping over the screen $a$, the trough J to receive the grade of coffee passing over the screen $b$, the trough K to receive that riding over the screen $c$, the trough L receiving that moving over the screen $d$, and the trough M receiving the final grade flowing over the screen $e$.

The coffee is fed to the upper screen $a$ through a hopper D of suitable construction supported by a rigid standard.

In rear of the reciprocating screen frame C is a rigid part of the machine composed of the upper compartment N inclosing the fan O, and the lower compartments or bins $b'$, $c'$, $d'$, $e'$, corresponding in number with the respective screens $b$, $c$, $d$, $e$, and each provided with an independent door P at its lower end in line with its inclined bottom Q. Between the fan compartment N and the series of bins $b'$, $c'$, $d'$, $e'$, is the partition R having at the top of each bin a draft opening S and independent regulating damper T. The dampers T are secured on rods V, W, X, Y, which extend outward, as shown in Fig. 5, and carry handles Z having set screws adapted to be utilized in connection with the slotted segments $m$ (see Fig. 2$^a$) for the purpose of retaining the dampers in any desired position with respect to the openings S. The rod V carries the damper T for the bin $d'$, the rod W the damper for the bin $b'$, the rod X that for the bin $c'$, and the rod Y that for the bin $e'$, and hence the draft through the bins may be independently regulated for each bin according to its necessities.

At the front of the bins $b'$, $c'$, $d'$, $e'$, and communicating respectively therewith, are the trunks $b''$, $c''$, $d''$, $e''$, which receive the coffee from the troughs J, K, L, M, respectively, as indicated in Figs. 2 and 3. The trough J leads into a chute $n$, shown by dotted lines in Fig. 3, extending to the trunk $b''$; the trough K communicates with the chute $o$ leading into the trunk $c''$; the trough L extends into the chute $p$ connected with the trunk $d''$, and the trough M passes to the chute $q$ leading into the trunk $e''$. The trunks $b''$, $c''$, $d''$, $e''$, open at their upper ends respectively into the bins $b'$, $c'$, $d'$, $e'$, and these bins each connect with the fan compartment N, and hence each of the trunks is subjected to the air suction but the degree of the upward current of air may be regulated for each trunk independently by means of the dampers T.

The coffee passing over the screen $b$ into the trough J passes downward through the chute $n$ into the trunk $b''$ where it is subjected to the air suction on its passage downward from the lower end of said trunk, the effect of the air suction being to elevate the hulls, sticks, strings, light black beans and quaker beans upward through the trunk $b''$ and cause the same to fall into the bin $b'$, while the fine dust passes upward through the opening S and is blown out through the fan O. The coffee passing over the screen $c$ is directed by the chute $o$ into the trunk $c''$ where it is subjected to the air suction and its screenings carried upward through the said trunk and into the bin $c'$. The coffee moving over the screen $d$ and passing into the trough L and chute $p$ enters the trunk $d''$ and has its screenings elevated by the air suction upward through said trunk and collected in the bin $d'$, while the coffee passing over the screen $e$ and entering the trough M and chute $q$ enters the trunk $e''$ where it is subjected to the air suction which elevates its screenings into the bin $e'$. The different grades of coffee separated by the screens $b$, $c$, $d$, $e$, are thus independently subjected to the air suction in different trunks, and the screenings from the different grades of coffee are independently collected in the different bins connected with said trunks.

The various grades of coffee separated by the screens and directed into the trunks $b''$, $c''$, $d''$, $e''$ pass downward through the lower ends of said trunks into separate receptacles, and the screenings for the different grades of coffee may be removed from the independent bins at pleasure through the doors P within the reciprocating frame C.

Directly above each screen are provided the knockers A' each of which consists of the hinged rod B' having upon its outer end the ball C' which will preferably be of rubber and of appropriate weight to strike against the screen and jar it sufficiently to prevent the coffee beans from clogging up the meshes therein.

The arm or rod B' is provided with an upward extension D' carrying the adjustable rod E' extending through the rear walls of the frame C, as indicated in Figs. 2, 6 and 7, and below the rod E' is provided the spring F' which exerts an outward tension against the end of the rod B' for the purpose of keeping the ball C' normally upward free of the screen. Opposite to the inner ends of the rods E', are provided upon the front wall of the rear rigid portion of the machine the shoulders or lugs G' against which the said rods E' strike during the reciprocation of the frame C. When the frame C is in its normal position at rest the rods E' will, as indicated in Fig. 2, be free of the shoulders or lugs G', but when the said frame C is reciprocated by means of the eccentrics E the said rods E' during the rearward thrust of the frame C will strike the shoulders or lugs G' and thus effect the depression of the arms B' and balls C', the latter rapping or knocking against the face of the screens and serving to jar the same sufficiently to prevent the coffee clogging the meshes thereof. As soon as the reciprocating frame C has started forward so as to relieve the contact of the rods E' with the shoulders or lugs G' the springs F' will restore the arms or rods B' and the balls C' to their upward position free of the screens.

In Figs. 6 and 7 the two positions of the rods E' and balls C' are shown, the former figure illustrating the ball C' in its upward position, and Fig. 7 showing it in its depressed position in contact with the screen.

During the use of the machine made the subject hereof, the fan O will be set in motion and the shaft F will be revolved, the effect of the fan being to create an upward suction through the trunks hereinbefore referred to, while the eccentrics E on the shaft F will cause a reciprocation of the frame C with its various screens, the movement of the frame C being permitted by the spring legs B. The coffee to be cleaned and separated is placed within the hopper D through which it passes to the upper screen $a$, the purpose of which is to remove the larger strings, sticks and other foreign matters contained within the coffee, thus in part at least cleaning the same. The size of the mesh of the screen $a$ is such as to permit the coffee beans to pass through the screen while the foreign matter rides over the edge thereof and falls into the trough I by which it is conducted away.

After the coffee has left the screen $a$ the purpose of the machine is to separate the same into its various grades and in pursuance of this object the coffee passing through the screen $a$ is caught by the incline $f$ and by it directed to the upper end of the screen $b$, whose mesh is such that the larger coffee beans or one grade of the coffee will pass over the said screen and fall into the trough J while the remaining portions of the coffee will pass through said screen $b$ and fall upon the incline $g$ which will conduct the same to the upper end of the screen $c$.

The grade of coffee entering the trough J passes into the trunk $b''$ as hereinbefore described. The coffee falling upon the screen $c$ from the incline $g$ is further separated by reason of the size of the mesh of said screen $c$ which prevents one grade of the coffee from passing through the same, and compels it to travel over said screen and fall into the trough K by which as above described it is conducted through the chute $o$ to the trunk $c''$ where it is subjected to the air suction and its screenings carried upward to the bin $c$. While one grade of coffee is traveling over the screen $c$ to the trough K the remaining body of the coffee passes through said screen and falls upon the incline $h$ by which it is directed to the upper end of the screen $d$ which removes a further grade of the coffee by preventing the same from passing through the mesh thereof and directing it to the trough L which connects with the trunk $d''$ as above described. That portion of the coffee not belonging to the grade which will enter the trough L will pass through the meshes of the screen $d$ and fall upon the incline $i$ down which it will move to the upper end of the screen $e$ which will separate the final grade of coffee by causing the same to ride over its surface and fall into the trough M by which and the chute $q$ it will be directed to the trunk $e''$. The finer foreign matter contained in the coffee will pass through the screen $e$ and fall upon the incline $j$ which will direct it to one side of the machine and permit it to escape therefrom as indicated in Fig. 3. It will thus be observed that all of the coffee passes through the screen $a$, while the remaining screens $b$, $c$, $d$, $e$, effect the separation of the various grades in accordance with the size of their meshes; the larger beans in each instance riding over the screen and being directed to its independent trunk, while the smaller beans to be further separated pass through the upper screens and are directed to the lower screens whose mesh is arranged to effect the further separation of the grades as above pointed out.

The operation of the machine is practically continuous since all of the screens operate at one time and continuously with the supply of coffee fed to the upper screen from the hopper D. During the travel of the coffee from the hopper D to the trunks provided for the respective grades, the frame C is reciprocated by means of the eccentrics E, and it jars the coffee sufficiently to cause it to pass down the inclined screens, while at the same time the screens are further jarred by the rapping of the balls C' against the same.

In view of the fact that a separate trunk and a separate bin is provided for each of the screens it will be found desirable in practice to designate the bins and screens by similar indicating marks or numerals in order that the attendant may be able to open any one of the bins desired and know that it contains the screenings from the particular screen in mind.

The screenings will of course vary in accordance with the mesh of the screens, and may be subjected to further cleaning and serparating for the obtaining of a poorer grade of coffee. The different grades of coffee separated by the machine will be collected at the lower ends of the independent trunks $b''$, $c''$, $d''$, $e''$, and the screenings from these particular grades of coffee will be collected from the bins $b'$, $c'$, $d'$, $e'$.

I do not confine the invention to the use of any particular number of screens; nor to the special character of the mesh thereof, since it is obvious that the number of screens may be increased or diminished and that the mesh of the screens will vary in accordance with the particular result sought, and the character of the coffee to be treated.

In the machines heretofore constructed by me in accordance with the invention I have provided extra screens which may be employed in place of some of the screens illustrated in the drawings for the purpose of effecting a different separation of the grades of coffee, and I have also furnished two sizes of peaberry screens which may be used when it is desired to separate the peaberry or small round coffee bean from the flat beans.

During the use of the machine the suction from the fan O will be regulated in accordance with the character of the coffee by means of the dampers T above described. For a very heavy coffee a stronger draft would be employed than for light coffee, and hence the particular degree of the air suction will be regulated in accordance with the judgment of the attendant and the nature of the screenings it is desired to elevate to the independent bins.

The hinged rods B' causing the balls C' to rap the screens while the latter are in use are important features and facilitate and expedite the operation of the machine.

What I claim as my invention, and desire to secure by Letters Patent, is—

1. In a machine for cleaning and grading coffee, the vibratory frame, the series of oppositely inclined sieves carried thereby, the sieves being of different mesh to effect a separate grade of the coffee to each of the grading sieves, an independent trough to each sieve to receive the grade of that particular sieve, and an incline beneath each sieve arranged to receive the several grades of coffee passing through the sieve next above it and deliver them on the upper portion of the sieve next below, combined with the independent trunks, one in communication with each sieve to receive its particular grade of coffee, a series of bins, one in communication with each trunk at its upper portion, means for creating an air current through each trunk and bin, and means for independently controlling the force of the current through each trunk and bin, substantially as and for the purposes described.

2. In a coffee separator and grader, the vibratory frame, the oppositely inclined sieves carried by said frame, the upper sieve having a mesh to permit all the grades of coffee to pass through it, and the lower sieves formed each with a different mesh so as to effect a separate grade of the coffee on each sieve, an incline under each sieve arranged to direct onto the upper portion of the next lower sieve the various grades of coffee passing through the next above sieve, a trough at the lower end of the upper sieve to receive foreign matter passing over the end of that sieve, and a separate trough to each of the lower sieves to receive the particular grade of coffee from each respective sieve, combined with independent trunks, one for each of the grading sieves to receive the distinct grade of each respective sieve, bins, one for each trunk and in communication with the upper portion of the trunk, and a fan for creating an air current through each independent trunk and bin, substantially as and for the purposes described.

3. In a coffee separator and grader, the vibratory frame carrying a series of inclined sieves of different mesh to effect a separate grade of coffee on each sieve, an incline beneath each sieve to receive the various grades passing through the sieve next above and deliver them to the next lower sieve, and an independent trough to each sieve to receive the grade of its particular sieve, combined with a stationary frame to one side of the vibratory frame and having a series of independent trunks on its side next to the vibratory frame and communicating one with each of the troughs of the sieves to receive each an independent grade of coffee, independent bins arranged in the stationary frame and communicating one with each of said trunks, a fan chamber in communication with all of said bins, and means for independently controlling communication between said fan chamber and each of said bins, substantially as and for the purposes set forth.

Signed at New York, in the county of New York and State of New York, this 22d day of March, A. D. 1893.

JOHN S. MILLER.

Witnesses:
CHAS. C. GILL,
ED. D. MILLER.